June 14, 1960    P. E. EDELMAN    2,941,159
TRANSISTOR-DRIVEN POWER SUPPLY
Filed Feb. 10, 1956
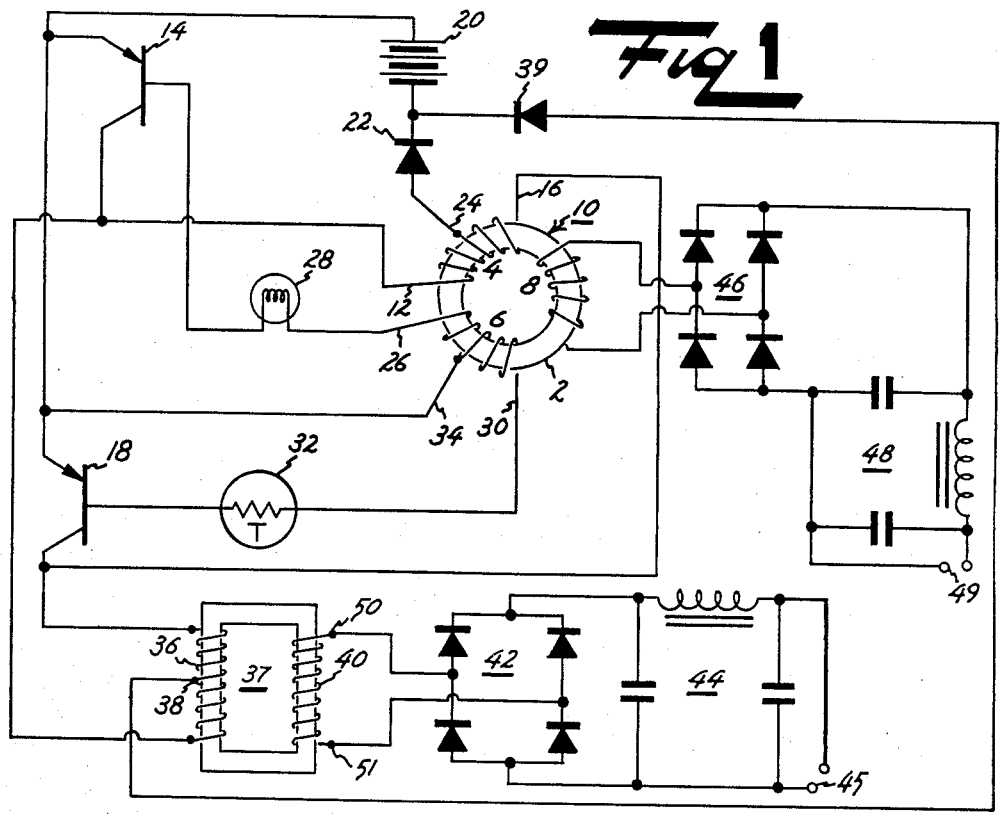
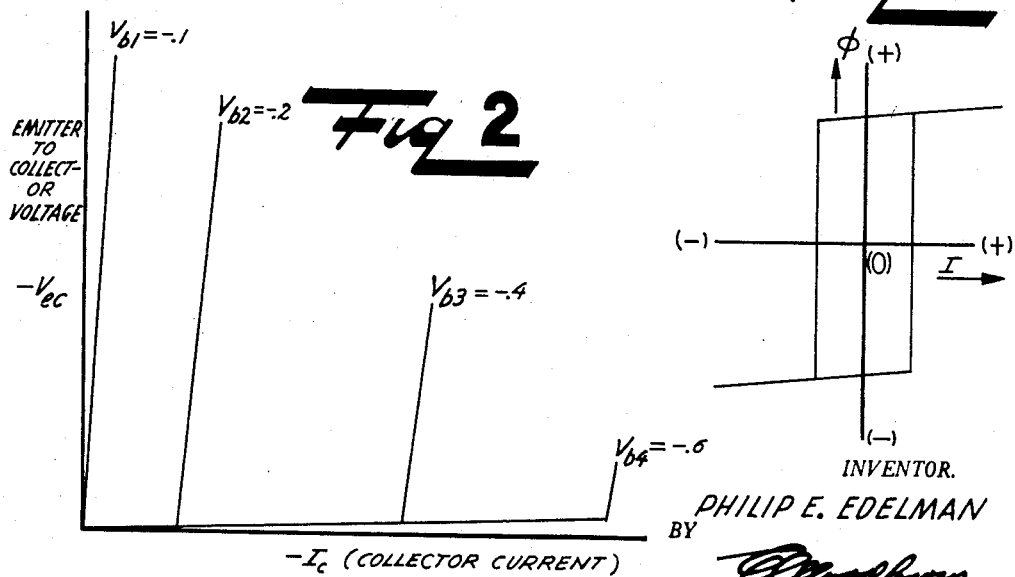
INVENTOR.
PHILIP E. EDELMAN
BY
*Woodbury*
ATTORNEY United States Patent Office 2,941,159
Patented June 14, 1960

2,941,159

TRANSISTOR-DRIVEN POWER SUPPLY

Philip E. Edelman, North Hollywood, Calif., assignor to Bendix Aviation Corporation, North Hollywood, Calif., a corporation of Delaware Filed Feb. 10, 1956, Ser. No. 564,763

7 Claims. (Cl. 331—113)

This invention relates to transistor-switched power supply systems energized from a source of direct current for supplying alternating or direct current power at desired voltage levels.

It has previously been proposed to utilize a transistor switching system in conjunction with a saturable core transformer to function as an oscillator to deliver alternating current. In such an arrangement, one winding of the transformer controls the transistor switching system which in turn controls the application of the D.C. input potential to another winding. When functioning properly, the system runs freely to convert direct current power into alternating current power. The alternating current power output is in square wave form, because the transformer core material preferably has a substantially rectangular hysteresis loop to produce the best switching action.

Previous systems of this type have been somewhat limited in application, due to the small amount of power they could supply. The saturable core transformer must be small to operate at a desirably high frequency, and in the event the load power withdrawn is increased above a rather low limit, the available switching potential drops below the required level, and the system stops oscillating. Another defect of the previous circuits is their occasional failure to start oscillating in response to application of the D.C. power thereto. A limitation of previous transistor-switched saturable core converter systems is that they delivered alternating current of substantially square wave form. This is advantageous for some, but not all, purposes.

The present invention resides in modifications of the previous systems to utilize their inherent advantages and reduce their disadvantages.

An object of the invention is to increase the power output and efficiency of transistor-switched power conversion systems without reducing the operating frequency.

Another object is to provide more positive starting of transistor-switched power conversion systems.

Another object is to provide a transistor-switched power conversion system in which the switching action is more positive under variable output load conditions.

Another object is to provide a transistor-switched power conversion system producing an A.C. output wave form different from that applied to the switching transistors.

Other more specific objects and features of the invention will appear from the description to follow.

Briefly, the essential novel features of the present invention are: (1) means for unbalancing the system at the time of starting, to insure the initiation of oscillations, and (2) the use, in addition to the usual saturable core transformer for switching the transistors, of a second power transformer that may be substantially larger than and have quite different characteristics from the saturable core transformer. These new features provide greater power output, more positive starting and running, latitude in the shape of the output wave, higher frequency operation, and higher over-all efficiency.

A full understanding of the invention may be had from the following detailed description with reference to the drawing, in which:

Fig. 1 is a schematic circuit diagram of a system in accordance with the invention.

Fig. 2 is a series of curves showing the operating characteristics of a junction transistor that may be used in the system of Fig. 1.

Fig. 3 is a hysteresis loop of a magnetic core material suitable for use in the system of Fig. 1.

In Fig. 1, there is shown a saturable magnetic core 2 which with windings 4, 6 and 8 forms a small transformer 10. The winding 4 has one end terminal 12 which is connected to the collector electrode of a transistor 14, and another end terminal 16 which is connected to the collector electrode of a transistor 18. The emitter electrodes of the transistors 18 and 14 are connected together and through a battery 20, and a diode 22, to a center tap 24 of the winding 4.

The winding 6 has one end terminal 26 which is connected through an automatically variable resistance, such as a tungsten-filament lamp 28 which varies in resistance directly with temperature, to the base electrode of the transistor 14. The other end terminal 30 of the winding 6 is connected through an automatically variable resistance 32, such as a varistor or thermistor, which varies in resistance inversely with temperature, to the base electrode of the transistor 18. A center tap 34 of the winding 6 is connected to the emitter electrodes of both the transistors 14 and 18. Connected between the two collector electrodes of the transistors 14 and 18 is a center-tapped winding 36 of a parallel load device or power transformer 37, the center tap 38 of which winding 36 is connected through a diode 39 to the battery 20. A secondary winding 40 of the power transformer 37 is connected to a full wave rectifier 42, which is in turn connected to an electrical filter circuit 44 having output terminals 45.

The winding 8 of the transformer 10 is connected to a full wave rectifier 46, which is in turn connected to a filter 48 having output terminals 49.

Prior to a consideration of the mode of operation of the system shown in Fig. 1, the characteristics of certain component elements of the system will be considered.

First consideration will be made of a semi-conductor device known as a junction transistor, such as transistors 14 and 18. There is shown in Fig. 2 a family of characteristic curves, $Vb_1$, $Vb_2$, $Vb_3$, and $Vb_4$, of a PNP type junction transistor as illustratively used in the system of Fig. 1. Each of the curves $Vb_1$, $Vb_2$, $Vb_3$, and $Vb_4$, is plotted with the voltage between the emitter and the collector electrodes as ordinate, and the current passing through the collector electrode as abscissa. The different curves show the different characteristics with different values of voltage $Vb_1$, $Vb_2$, $Vb_3$, and $Vb_4$ applied between the emitter and the base electrodes.

The curves indicate that when the negative potential $V_b$ between the emitter and base is low as shown by the $Vb_1$ curve, large increases in voltage applied between the emitter and collector electrodes will cause essentially no increase in the collector current. If, however, the potential $V_b$ is highly negative, as shown by the $Vb_4$ curve, small increments in voltage applied between the emitter and the collector electrodes will be accompanied by large increases in collector current. Therefore, if the potential $V_b$ is shifted between the values $Vb_1$ and $Vb_4$ the transistor will act as a switch. In the operation of a PNP transistor as a switch, the transistor will present little resistance between the collector and emitter electrodes, if the base electrode is appreciably more negative than the emitter electrode; a high resistance will be presented if the base electrode is more positive than the emitter electrode.

Consider now Fig. 3 which shows a typical plot of electrical current I as abscissa, and magnetic flux $\phi$ as ordinate, to form the hysteresis loop for a saturable magnetic material such as that illustratively used in the core 2 of the transformer 10 of Fig. 1. The hysteresis loop, as shown in Fig. 3, is essentially rectangular. The flux in a core composed of a material having a rectangular hysteresis loop may be seen from Fig. 3 to vary in response to a very slight current change from one level of saturation to the other. This type of variation in flux will induce a square wave voltage in other windings on the core such as windings 6 and 8.

Consider now the operation of the system shown in Fig. 1 wherein a plurality of semi-conductor devices and magnetic devices are combined to convert power from direct current to alternating current, or to direct current having a different voltage. During each half cycle of the operation of the system, one of the transistors 14 or 18 will be conducting to provide a closed switch while the other will be non-conducting to provide an open switch. The bias voltage on the transistors will then change, and the states of the transistors will be reversed. The core 2 will be magnetized with one polarity or the other depending upon which of the transistors 14 or 18 is conductive. The reversal of polarity occurs repetitively, and induces an alternating voltage in the windings 6 and 8 of the transformer 10.

Assume first that the base electrode of the transistor 18 is driven sufficiently negative by winding 6, so that transistor 14 is conducting, thereby allowing a current to flow from the positive side of the direct current source or battery 20 through the transistor 14, from its emitter electrode to its collector electrode, to the terminal 12 of the winding 4, through half the winding 4 to the center tap 24, and then through the diode 22 back to the battery 20. This current increases at a rate determined by circuit characteristics until the core 2 becomes saturated with magnetic flux. Upon saturation of the core 2, several effects occur almost simultaneously: First, the current in the winding 4 rises sharply to a constant value determined mainly by the voltage of the battery 20 and the amount of resistance presented by the transistor 14 and the transformer windings. The induced voltage in the winding 6 then drops to zero, due to the fact that current in the winding 4 is stable and the flux in the core 2 is no longer changing. With the absence of an induced voltage in the winding 6, no voltages will be applied to the base electrodes of the transistors 14 and 18 to maintain them conducting and non-conducting, respectively. The current through one half of the winding 4 will, therefore, decrease as the transistor 14 presents a higher resistance. With the cessation of current in the winding 4, the magnetic flux in the core 2 drops back to a stable state, causing a slight decrease in flux. This slight decrease in flux induces a voltage in the winding 6, opposite to that previously present, which tends to apply a positive voltage to the base electrode of the transistor 14 and a negative voltage to the base electrode of the transistor 18. These voltages will cause the transistor 18 to become more conductive. The heavier the transistor 18 conducts, the greater the current flowing through the winding 4, from the terminal 16 to the center tap 24, will become, and the core 2 will now be driven to saturation at the other end of the hystersis loop.

Due to the saturable nature of the core 2, the flux therein will vary from a saturation point of one polarity to a saturation point of oppsite polarity, and the winding 8 will thus have induced within it a voltage which varies with the flux in the core 2, i.e., a rectangular alternating voltage. The voltage induced in the winding 8 is rectified by the full wave rectifier 46, and filtered by the filter 48, to form at the terminals 49 a smooth direct current voltage of a different magnitude than the direct current voltage of the battery 20. The amount of power which may be drawn from the winding 8, however, is somewhat limited, in that the winding 6 must have sufficient voltage induced therein to effect the switching operation of the transistors 14 and 18. As the power drawn from the winding 8 is increased, a point will be reached at which the flux variation in the core 2 will not induce sufficient voltage in the winding 6 to effectively switch the transistors 14 and 18.

The transformer 37 will, however, supply increased power loads without effecting the switching of the transistors 14 and 24. The transformer 37 is so connected that a current will flow in one direction through the primary winding 36 to the center tap 38 when the transistor 14 is conducting, and in the other direction when the transistor 18 is conducting. At a time when the transistor 14 conducts, a current will flow from the positive side of the battery 20 through the transistor 14 (from the emitter electrode to the collector electrode) and the winding 36, to the center tap 38, and then through the diode 39 back to the battery 20. At a time when the transistor 18 is conducting, the current path will be from the battery 20 through the transistor 18 (from emitter to collector) then through the other half of the winding 36 to the center tap 38 and back to the battery 20, through the diode 39. During the time when one of the transistors 14 and 18 is conducting, and the other is not, a current will be passed to energize the transformer 37 in one polarity. When the other of the transistors is conducting, the transformer will be energized in the opposite polarity. An alternating voltage will thus be induced in the winding 40 which may be utilized as such at terminals 50 and 51 or be rectified by the rectifier 42 and filtered by the filter 44, to provide a direct current voltage at the terminals 45. The amount of power taken from the winding 40 of the transformer 37 will have no effect on the functioning of the transformer 10 to switch the transistors 14 and 18, and, therefore, an additional load may be sustained by the transformer 37. In the event that a square wave output is desired from the transformer 37, the core of the transformer may be formed of a material having a hysteresis loop of rectangular shape.

It is sometimes desirable in the operation of the system to electrically isolate the transformer 37 from the transformer 10. This isolation is effected by means of the diodes 22 and 39, which prevent currents reflected into the winding 36 by loading variations on the transformer 37 from being coupled into the winding 4. These diodes are preferably semi-conductor devices of the silicon type. The diodes 20 and 39 are thus connected to provide isolating means to prevent detrimental couplings between the magnetic devices 37 and 10.

In the operation of a system as shown in Fig. 1, a certain amount of unbalance is initially necessary to start the oscillation of the system, and it is possible for the system to be energized in such a manner that both the transistors 14 and 24 pass approximately the same amount of current, so that no oscillations will take place. The lamp 28 and the thermistor 32 are utilized to temporarily cause an unbalance in the system until such time as oscillation of the system has been initiated. The filament of lamp 28 is of the type which, when cold, has a relatively low resistance; however, upon being heated, its resistance abruptly increases in value. On the other hand, the thermistor 15 has a higher resistance when cold than when heated. The lamp 27 and the thermistor 32 are so chosen as to provide approximately equal resistance when heated to the temperature which they assume during an equilibrium state of operation. However, initially the resistance between the terminal 26 and the base electrode of the transistor 14 is lower than the resistance between the terminal 30 and the base electrode of the transistor 18. This difference unbalances the system sufficiently to initially cause the transistor 18 to be conductive and the transistor 14 to be non-conductive. Once the system has reached an equilibrium state of temperature, the resistance between the terminals 26 and 30 and the base electrodes of the transistors 14 and 18, respectively, will become approximately equal, so as to balance the operation period of the transistors 14 and 18. An improved regulation at the output terminals is effected because variation in the power load taken at terminals 45 does not detrimentally influence the described switching action.

The transformer 10 may be very small to switch the transistor states at a favorable high frequency whereas the power transformer 37 can be as large as necessary to utilize the maximum current-carrying capacities of the transistors. Furthermore, if a square wave output is not desired, the core of the power transformer may be of inexpensive material such as silicon steel.

It may therefore be seen that the invention provides a transistor power system for converting direct current into alternating current of relatively high frequencies, in which increased loads up to the full capabilities of the transistors 14 and 18 may be supported. The system also incorporates means for starting initial oscillations which will later be freely maintained inherently by the system.

Although for the purpose of explaining the invention particular embodiments thereof have been shown and described, obvious modifications will occur to a person skilled in the art, and I do not desire to be limited to the exact details shown and described.

I claim:

1. A transistor driven power supply comprising: a plurality of semi-conductor devices for performing controlled switching operations; a magnetic core transformer having at least a first and a second winding; means for energizing said first winding in one manner when certain of said semi-conductor devices pass currents, and in another manner when other of said semi-conductor devices pass currents; said second winding being adapted to have a voltage induced therein in one manner when said first winding is energized in said one manner, and in another manner when said first winding is energized in said other manner; a power transformer having a first power winding connected to be energized through said semi-conductor devices in parallel relation with said first winding, and a second power winding connected to an output circuit; and automatically variable impedance means connected between said magnetic core transformer and certain of said plurality of semiconductor devices, for providing an initial starting unbalance.

2. A converter comprising: a plurality of semi-conductor devices for performing controlled switching operations; a saturable-core transformer having at least a first and a second winding; means for energizing said first winding in one manner when one of said semi-conductor devices passes current, and in another manner when another of said semi-conductor devices passes current; said second winding being adapted to have a voltage induced therein in one manner when said first winding is energized in said one manner and in another manner when said first winding is energized in said other manner; and automatically-variable impedance means coupling said second winding to said semi-conductor devices to provide switching signals for said semi-conductor devices.

3. In a power converter for a direct current power source, wherein a saturable-core transformer has a first winding adapted to be energized through a transistor switching circuit and a second winding adapted to receive induced voltages with the energization of said first winding, the improvement comprising automatically-variable impedance means coupling said second winding to said transistor switching circuit to control said transistor switching circuit.

4. A converter system, operable to convert direct current from a direct current source into alternating current comprising: a semiconductor switching system operable between two states; a saturable core transformer having at least a first and a second winding, inductively coupled; means for energizing said first winding from said direct current source in one manner when said semiconducting switching system is in one state and in another manner when said semiconductor switching system is in another state; means coupling said second winding to said semiconductor switching system such as to control the state of said semiconductor switching system; a power transformer having a first power winding adapted to be energized from said source through said semiconductor switching system, and a second power winding adapted to be connected to an output circuit; and means for isolating said first winding of said saturable core transformer from said first power winding comprising a diode network connected between said source of direct current and a center tap of said first winding of said saturable core transformer and a center tap of said first power winding of said power transformer.

5. A converter system operable to convert direct current from a direct current source into alternating current comprising: a semiconductor switching system operable between two states; a saturable core transformer having at least a first and a second winding, inductively coupled; means for energizing said first winding from said direct current source in one manner when said semiconducting switching system is in one state and in another manner when said semiconductor switching system is in another state; means coupling said second winding to said semiconductor switching system such as to control the state of said semiconductor switching system; a power transformer having a first power winding adapted to be energized from said source through said semiconductor switching system and a second power winding adapted to be connected to an output circuit; and automatically variable impedance means connected between said saturable core transformer and said semiconductor switching system to provide a temporary unbalance for starting purposes.

6. In a power converter for a direct current power source, wherein a transformer has a first winding adapted to be energized through a transistor switching circuit comprising two transistors and a second winding adapted to receive induced voltage with the energization of said first winding, the improvement comprising automatically variable impedance means coupling said second winding to said transistor switching circuit to control said transistor switching circuit, said automatically variable impedance means comprising a pair of impedance elements the impedances of which vary differently in response to current flow therethrough, one of said elements coupling said second winding to one transistor and the other of said elements coupling said second winding to the other transistor.

7. Apparatus according to claim 6 in which said two elements have substantially different impedances at initiation of current flow therethrough and substantially equal impedances after current flow therethrough for a period of time.

References Cited in the file of this patent

UNITED STATES PATENTS

| | | |
|---|---|---|
| 2,740,086 | Evans et al. | Mar. 17, 1956 |
| 2,748,274 | Pearlman | May 29, 1956 |
| 2,757,243 | Thomas | July 31, 1956 |
| 2,773,220 | Aron | Dec. 4, 1956 |
| 2,791,693 | Moore | May 7, 1957 |
| 2,843,815 | Driver | July 15, 1958 |
| 2,852,730 | Magnuski | Sept. 16, 1958 |

OTHER REFERENCES

"An Amplitude Stabilized Transistor Oscillator," by Kretzmer, published in Proc. of IRE, vol. 42, pp. 391–401, February 1954.

"Transistors as On-Off Switches in Saturable Core Circuits," by Bright et al.; pp. 79–82 of "Electrical Manufacturing" for December 1954.